United States Patent
Hayashi

(10) Patent No.: US 9,073,455 B2
(45) Date of Patent: Jul. 7, 2015

(54) SLIDE RAIL DEVICE FOR VEHICLE

(71) Applicant: SHIROKI CORPORATION, Kanagawa (JP)

(72) Inventor: Naoki Hayashi, Kanagawa (JP)

(73) Assignee: SHIROKI CORPORATION, Kanagawa (JP)

( * ) Notice: Subject to any disclaimer, the term of this patent is extended or adjusted under 35 U.S.C. 154(b) by 327 days.

(21) Appl. No.: 13/758,403

(22) Filed: Feb. 4, 2013

(65) Prior Publication Data

US 2013/0206950 A1  Aug. 15, 2013

(30) Foreign Application Priority Data

Feb. 15, 2012  (JP) ................ 2012-030045

(51) Int. Cl.
*F16M 13/00*  (2006.01)
*B60N 2/08*  (2006.01)
*B60N 2/07*  (2006.01)

(52) U.S. Cl.
CPC .. *B60N 2/08* (2013.01); *B60N 2/07* (2013.01); *B60N 2/0705* (2013.01); *B60N 2/0715* (2013.01); *B60N 2/0818* (2013.01); *B60N 2/0875* (2013.01)

(58) Field of Classification Search
CPC .................................. B60N 2/0715
USPC ........ 248/424, 429, 430; 297/344.11, 344.18
See application file for complete search history.

(56) References Cited

U.S. PATENT DOCUMENTS

| | | | |
|---|---|---|---|
| 8,360,383 B2 * | 1/2013 | Kimura et al. ............. | 248/430 |
| 2008/0231101 A1 * | 9/2008 | Sakakibara et al. ....... | 297/344.1 |
| 2013/0206952 A1 * | 8/2013 | Yamada et al. ............ | 248/429 |
| 2013/0341479 A1 * | 12/2013 | Yamada et al. ............ | 248/430 |
| 2014/0138510 A1 * | 5/2014 | Yamada et al. ............ | 248/429 |

FOREIGN PATENT DOCUMENTS

| | | |
|---|---|---|
| JP | 2005-238929 A | 9/2005 |
| JP | 2011-230717 A | 11/2011 |

OTHER PUBLICATIONS

Japanese Office Action dated Nov. 11, 2014 issued in corresponding Japanese patent application 2012-30045 (pp. 1-2).
English Translation Abstract of JP 2005-238929 published Sep. 8, 2005.
English Language Abstract of JP 2011-230717 A (Nov. 17, 2011).

* cited by examiner

*Primary Examiner* — Gwendolyn W Baxter
(74) *Attorney, Agent, or Firm* — Millen, White, Zelano & Branigan, P.C.

(57) ABSTRACT

A slide rail device for a vehicle includes a lower rail; an upper rail supported on the lower rail to be slidably movable relative thereto; a lock mechanism between the upper and lower rails; a lock-operation lever inserted into the upper rail; a rotational supporter supporting the lock-operation lever to be rotatable between locked and unlocked positions; a handle; a biasing spring having an engaging portion which engages with the lock-engaging portion so that the engaging portion is immovable relative to the lock-engaging portion wherein the biasing spring supports the rear-end portion of the handle; and a spring support portion, provided on the upper rail, which is positioned immediately below the biasing spring and prevents the biasing spring from falling downward from an underside opening of the lock-operation lever when the rotational supporter supports the lock-operation lever.

3 Claims, 10 Drawing Sheets

SLIDE RAIL DEVICE FOR VEHICLE

BACKGROUND OF THE INVENTION

1. Field of the Invention

The present invention relates to a slide rail device, for a vehicle, which supports a seat in a slidable manner.

2. Description of Related Art

A slide rail device for a vehicle which is disclosed in Japanese Unexamined Patent Application No. 2011-230717 is provided with a pair of left and right lower rails extending in a forward/rearward direction (of the vehicle) and fixed to a floor of the vehicle; a pair of left and right upper rails which support a seating portion of a seat and are slidably supported by the pair of left and right lower rails; a lock mechanism provided between the upper rails and the lower rails which restricts the sliding movement of the upper rails and releases sliding movement restriction of the upper rails; a pair of left and right lock-operation levers (lock-release levers) which are respectively inserted inside the upper rails and each are open at the front end and lower end thereof; and a loop handle, the left and right rear ends of which are inserted into the front end internal spaces of the left and right lock-operation levers, respectively. The lock-operation levers are each upwardly and downwardly rotatable between a locked position at which a sliding movement restriction, via the lock mechanism, of the upper rails is allowed, and a unlocked position at which the sliding movement restriction is released by moving the front ends of the lock-operation levers upward from the locked position.

Furthermore, this slide rail device is provided with a torsion spring formed from spring wire and attached to the front end internal space of each lock-operation lever. The torsion spring is first attached to the internal space (surface) of each lock-operation lever before the loop handle is attached to each lock-operation lever, and is immovable in the forward/rearward and upward/downward directions relative to the lock-operation lever due to the torsion spring itself engaging with the lock-operation lever at a plurality of locations. After the torsion spring is assembled into the front end internal space of each lock-operation lever, when each end portion of the loop handle is inserted into the internal space of each respective lock-operation lever from the front end of each respective lock-operation lever, the torsion spring supports the rear ends of the loop handle by being engaged with the rear ends of the loop handle.

When an occupant is not operating the loop handle, the upper rail is prevented from sliding relative to the lower rail by the lock mechanism provided therebetween. Whereas, if the occupant rotates the loop handle upwardly, the lock-operation lever that was positioned at the locked position rotates to the unlocked position, and since the slide-prevention of the lock mechanism is released, the upper rail becomes slidable relative to the lower rail.

The above-described slide rail device for a vehicle that is disclosed in Japanese Unexamined Patent Application No. 2011-230717 has a structure in which the torsion spring is assembled into the front end internal space of the lock-operation lever before the loop handle is attached to the lock-operation lever. However, in order to attach the torsion spring into the internal space of the lock-operation lever, it is necessary to elastically deform the torsion spring and engage the plurality of engaging portions thereof with corresponding engaging portions of the lock-operation lever. Therefore, assembling the torsion spring into the lock-operation lever is difficult. Accordingly, it is difficult to carry out a rapid assembly operation of the slide rail device for a vehicle.

SUMMARY OF THE INVENTION

The present invention provides a slide rail device, for a vehicle, in which a biasing spring for attaching a handle to a lock-operation lever can be easily attached so as not to be substantially movable in the forward/rearward direction relative to the lock-operation lever, and so as not to drop out (down from) an underside opening of the lock-operation lever.

According to an aspect of the present invention, a slide rail device for a vehicle is provided, including a lower rail which extends in a forward/rearward direction and is immovable relative to a floor of the vehicle; an upper rail which supports a seat and is supported on the lower rail to be slidably movable in the forward/rearward direction relative to the lower rail; a lock mechanism provided between the upper rail and the lower rail, wherein the lock mechanism one of restricts and releases the restriction of the sliding movement of the upper rail; a lock-operation lever which is inserted into an internal space of the upper rail, wherein the front side and the underside of the lock-operation lever is open, and lower edge portions of the lock-operation lever is provided with a lock-engaging portion; a rotational supporter which supports the lock-operation lever, so that when the lock-operation lever is positioned at a predetermined position in the internal space, the lock-operation lever is upwardly and downwardly rotatable between a locked position and an unlocked position with respect to the upper rail while not being slidably movable relative to the upper rail, wherein the lock mechanism is allowed to restrict the sliding movement of the upper rail at the locked position, and wherein, at the unlocked position, a front portion of the lock-operation lever is moved upward from the locked position whereby the lock mechanism releases the restriction of the sliding movement of the upper rail; a handle, wherein a rear-end portion of the handle is inserted into the internal space of the lock-operation lever, and wherein a front end portion of the handle projects forward from a front opening of the lock-operation lever; a biasing spring which is provided with an engaging portion which engages with the lock-engaging portion from below so that the engaging portion is substantially immovable relative to the lock-engaging portion in the forward/rearward direction, wherein the biasing spring supports the rear-end portion of the handle in the internal space of the lock-operation lever while restricting the movement of the handle relative to the lock-operation lever in the forward/rearward direction; and a spring support portion, provided on the upper rail, which is positioned immediately below the biasing spring and prevents the biasing spring from falling downward from an underside opening of the lock-operation lever when the rotational supporter supports the lock-operation lever.

According to the present invention, by simply engaging the engaging portion of the biasing spring with a lock-engaging portion of the lock-operation lever from the underside thereof, the biasing spring can be easily assembled into the internal space of the lock-operation lever while the relative movement in the forward/rearward direction is restricted, and the rear end of the handle can be supported by the biasing spring by inserting the rear end of the handle in the internal space of the lock-operation lever. Accordingly, a rapid assembly operation of the slide rail device for a vehicle can be carried out.

Moreover, when the rotational supporter provided on the upper rail rotatably supports the lock-operation lever, since the spring support portion is provided directly below the biasing spring, the biasing spring can be prevented from dropping down from the underside opening of the lock-operation lever.

It is desirable for the biasing spring to include a spring-support contact portion which is constantly in rotatable contact with the spring support portion, a handle contacting portion which is constantly in rotatable contact with an underside of the handle at a position that is away from the spring-support contact portion in an upward and forward/rearward direction.

Accordingly, when the handle is rotated (when the lock-operation lever is rotated between the locked position and the unlocked position), since the spring-support contact portion of the biasing spring is always in contact with the spring support portion, and the handle contact portion of the biasing spring is always in contact with the underside of the handle (since the contact positions between the biasing spring and the spring support portion and the between the biasing spring and the handle do not change), the biasing spring elastically deforms in the same manner every time the handle is rotated. Accordingly, variations in the operational force upon the handle being rotated do not easily occur, so that the handle can be rotatably operated with the same amount of force each time.

It is desirable for the lock-operation lever to include an upper support member; and a front spring support portion which is positioned further forward than the spring support portion and moves upward together with the lock-operation lever when the lock-operation lever is rotated from the locked position to the unlocked position, wherein an upper supported surface is formed on a portion the handle that is positioned further forward from the rear end of the handle, wherein the upper supported surface is in rotatable contact in an upward/rearward direction with the upper support member from below. The biasing spring includes an upward-pressing portion which is positioned further forward from the spring-support contact portion and which biases the underside of the handle in an upward direction; and a lower support portion which is constantly in contact with an upper surface of the front spring support portion at a position further forward than the rear end of the front spring support portion, wherein a portion of the biasing spring positioned between the lower support portion and the spring-support contact portion is constantly positioned away from the front spring support portion.

Accordingly, since the biasing spring is provided with a lower support portion which is constantly in contact with a portion in front of the rear-end position on an upper surface of the front spring support portion, and the part of the biasing spring that is positioned between the lower support portion of the biasing spring and the spring-support contact portion is always positioned away from the front spring support portion, (compared to a structure in which the lower support portion is not provided, and part of the biasing spring contacts the front spring support portion during a rotational operation of the handle) it is possible to increase the distance in the forward/rearward direction from the position of contact with the front spring support portion with the biasing spring to the position of contact between the spring support portion and the spring-support contact portion. Accordingly, (compared to a structure in which the lower support portion is not provided, and part of the biasing spring contacts the front spring support portion during a rotational operation of the handle) since the biasing spring can be elastically deformed with a small amount of force upon the handle being operated to perform a lock-release operation, the handle can be operated with a small amount of force in order to release a locked state.

The present disclosure relates to subject matter contained in Japanese Patent Application No. 2012-30045 (filed on Feb. 15, 2012) which is expressly incorporated herein in its entirety.

BRIEF DESCRIPTION OF THE DRAWINGS

The present invention will be discussed below in detail with reference to the accompanying drawings, in which.

DESCRIPTION OF THE EMBODIMENTS

Figure 1:
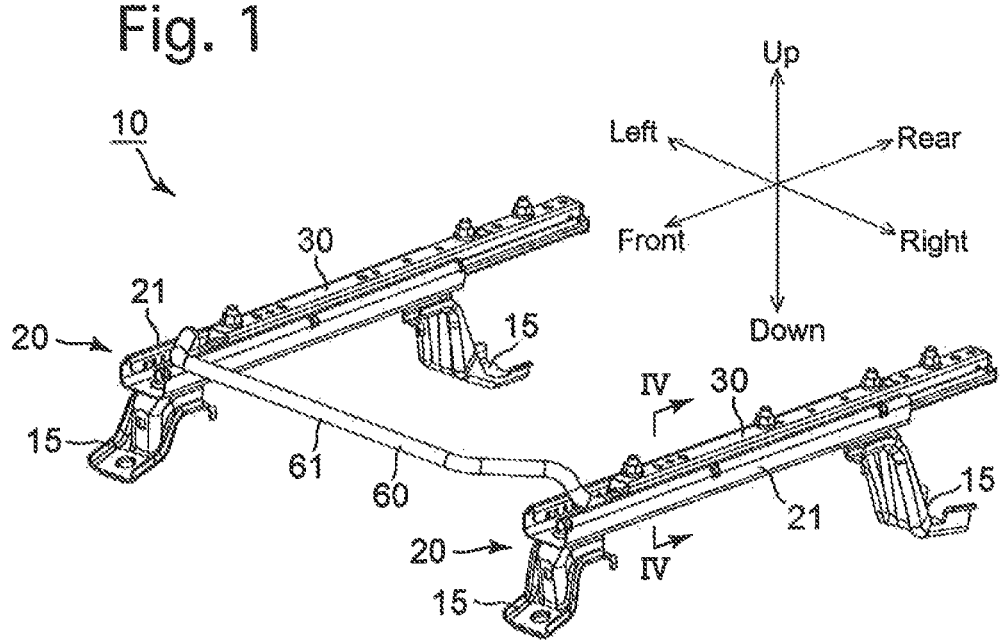
FIG. 1 is a front perspective view of a slide seat device in an embodiment of the present invention, viewed obliquely from above, showing the upper rail slided to the rear-end position.
Figure 2:
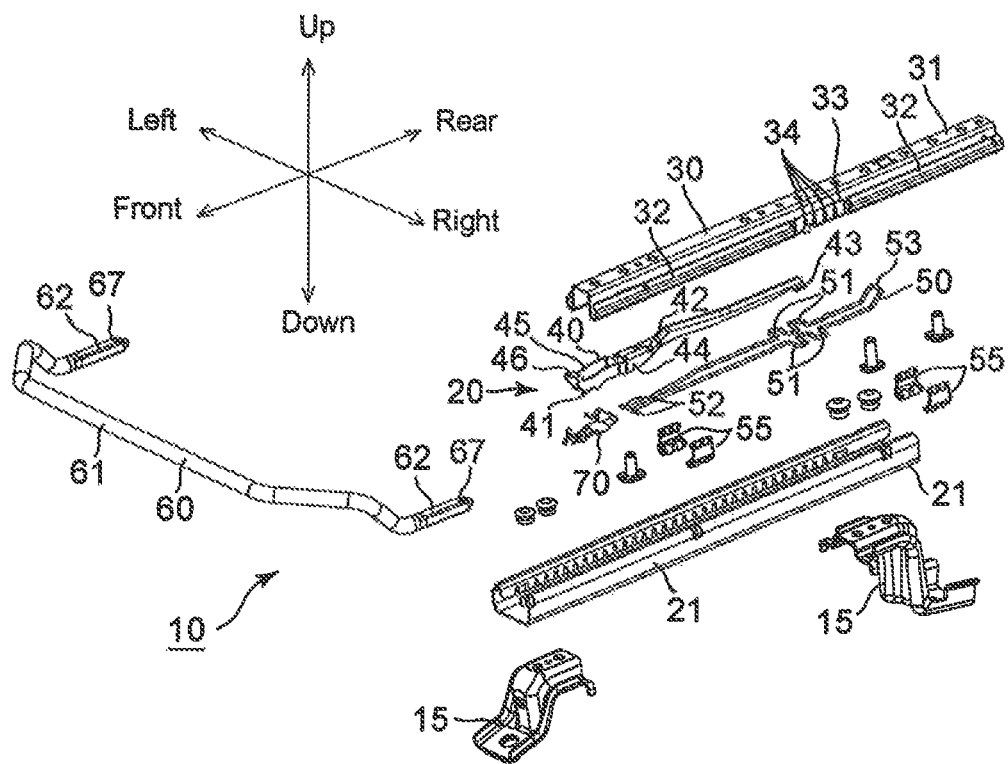
FIG. 2 is an exploded front perspective view of the slide rail device, viewed obliquely from above, with the left rail unit omitted for clarity.
Figure 3:
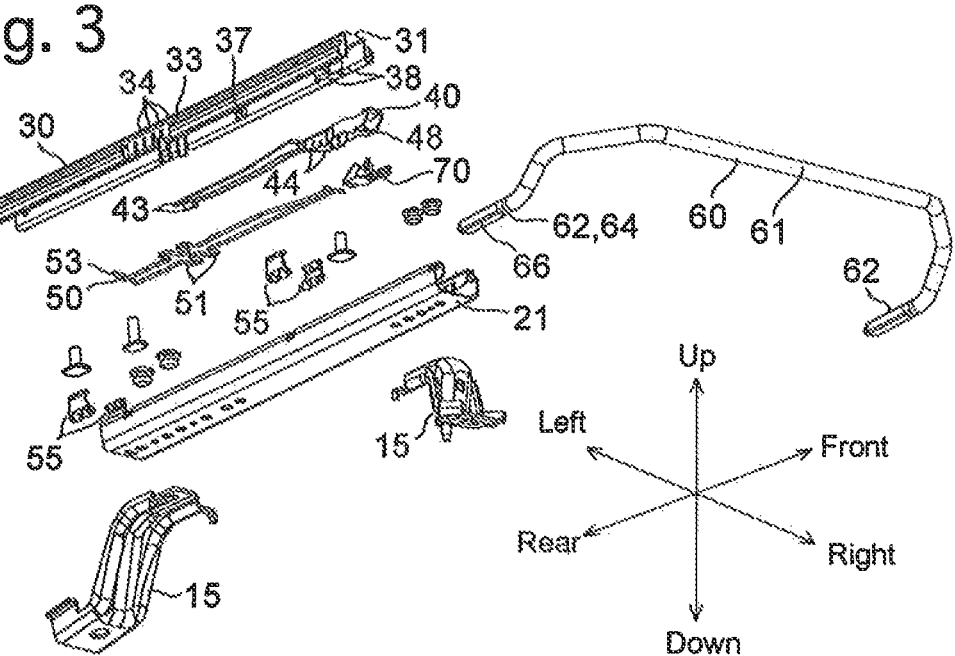
FIG. 3 is an exploded front perspective view of the slide rail device, viewed obliquely from below, with the left rail omitted.

A first embodiment of the present invention will be hereinafter discussed with reference to the drawings. Directions described in the following description are defined based on the directions of the arrows shown in the drawings.

A slide rail device 10 is installed onto a vehicle interior floor of an automobile (vehicle), not shown in the drawings, and a seat (not shown) is fixed onto the upper side of the slide rail device 10 (upper rail 30).

The detailed structure of the slide rail device 10 will be discussed hereinafter.

The slide rail device 10 is provided, as large components thereof, with a pair of left and right rail units 20 and a loop handle 60 which connects the front ends of the left and right rail units 20. The left and right rail units 20 are mutually bilaterally symmetrical while the loop handle 60 has a bilaterally-symmetrical shape, and therefore, the slide rail device 10 is bilaterally symmetrical as a whole.

The left and right rail units 20 have a structure which will be discussed hereinafter.

Figure 5:
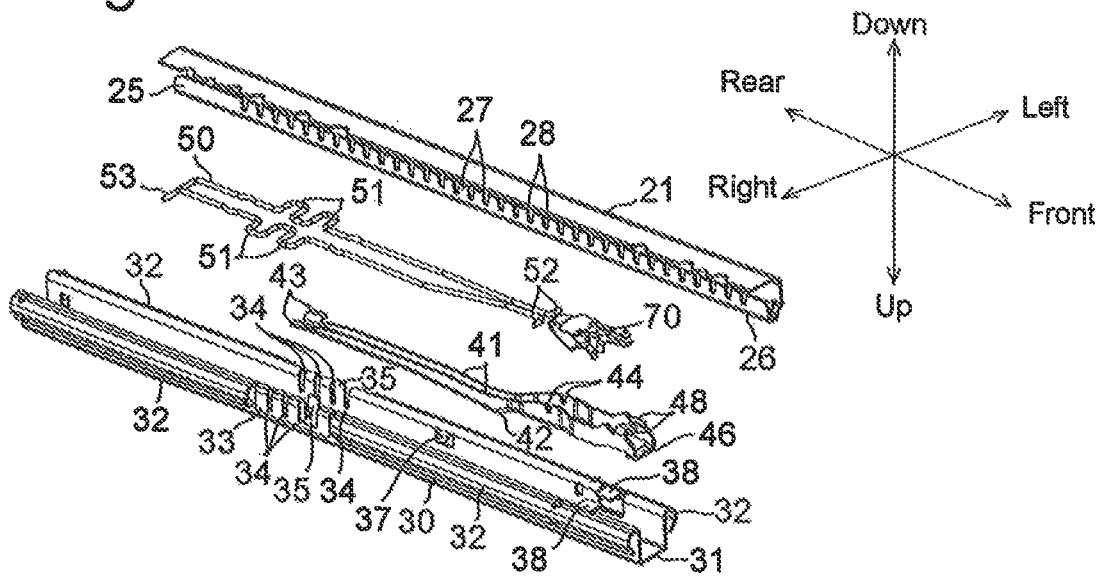
FIG. 5 is a exploded perspective view of a slide unit with the lower rail shown in a longitudinal sectional view.

The rail unit 20 is provided with a lower rail 21 which is mounted onto the interior floor by a pair of front and rear mounting brackets 15. The lower rail 21 is a metal channel member which extends in the forward/rearward direction and the top thereof is open, and is provided with a substantially-horizontal bottom wall 22, a left and right pair of outer wall portions 23 which extend upward from the left and right sides of the bottom wall 22, respectively, and a pair of left and right roof portions 24 which extend inward from the top edges of the pair of left and right outer wall portions 23, and a pair of left and right inner wall portions (vertical walls) 25 which extend downward from the inner edges of the pair of left and right roof portions 24, respectively. As shown in FIG. 5, etc., the upper edge portions of the left and right inner wall portions 25 (portions connecting with the left and right roof portions 24) constitute base-edge support portions 26 that extend in the forward/rearward direction. A large number of lock teeth (lock mechanism) 27, the upper ends of which are connected to the base-edge support portions 26, are formed in the lower edges of the left and right inner wall portions 25 and are arranged at equal intervals in the forward/rearward direction. Lock grooves (lock mechanism) 28 are formed in between mutually adjacent lock teeth 27 and are open at the lower ends thereof.

Figure 6:
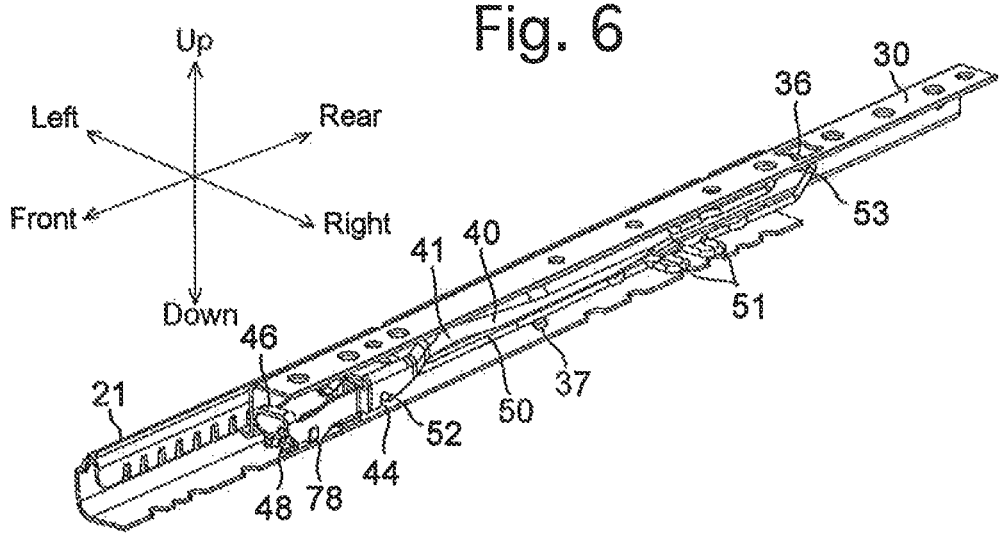
FIG. 6 is a front perspective view of a slide unit, viewed obliquely from above, with the lower rail shown in a longitudinal sectional view.
Figure 7:
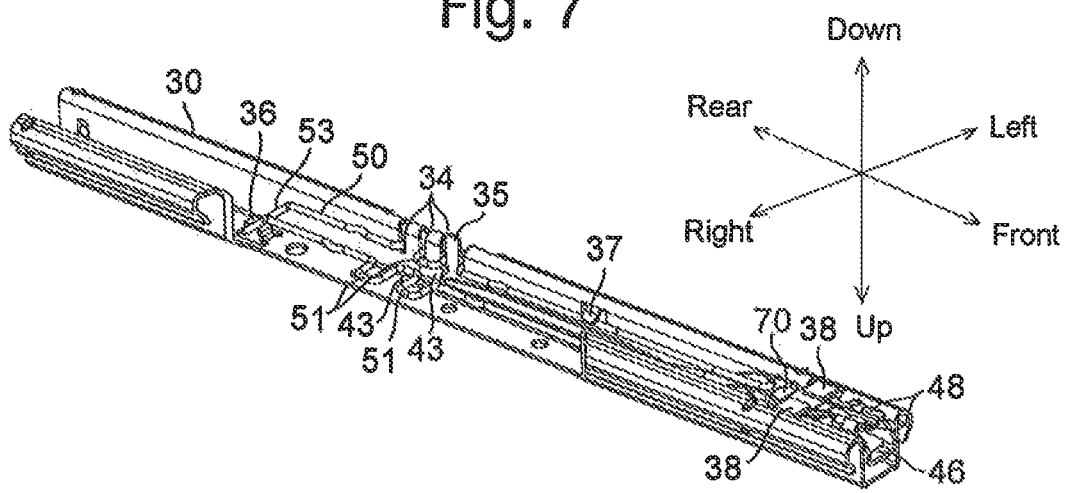
FIG. 7 is a front perspective view of an upper rail with a portion cut away, a lock-release lever and a lock spring, viewed obliquely from below.

The rail unit 20 is provided with an upper rail 30 that is slidable in the forward/rearward direction with respect to the associated lower rail 21. The upper rail 30 is a metal channel member which extends in the forward/rearward direction and the bottom thereof is open, and is provided with a base 31 which has a substantially inverted U-shaped cross section, upright walls 32 which extend upward except for the central portions of the lower ends of the left and right side wall portions of the base 31 in the longitudinal direction, and locking walls 33 which extend upward from the aforementioned central portions of the lower ends of the left and right side wall portions of the base 31. As shown in FIGS. 2, 3, 5 and 9, etc., four forward/rearward-movement restricting grooves 34 are formed to extend through the lower edges of the left and right locking walls 33 and the lower edges of the side wall portions of the base 31 to extend upward. Furthermore, the lower ends of the side wall portions of the base 31 are provided with a pair of restricting lugs 35 which is integrally formed with the side wall portions and projects downwardly so as to extend further downward than the lower edges (open ends) of the forward/rearward-movement restricting grooves 34. In addition, as shown in FIGS. 6 and 7, etc., the base 31 is provided, in the vicinity of a central portion of the roof portion thereof, with a locking lug 36 which is formed by cutting and raising a portion of the base 31 to extend downward and subsequently rearward, and is provided, on portions of the left and right side wall portions which are positioned slightly in front of central portions of the left and right side wall portions of the base 31, with locking lugs 37 which are formed by cutting and raising portions of the left and right side wall portions of the base 31 to extend inward. Furthermore, substantially horizontal lower support members (spring support portion) 38 which extend inwardly from the lower edges of the left and right side wall portions of the base 31 are integrally formed with the base 31 in the vicinity of the front end of the base 31.

The rail unit 20 is further provided with a lock-release lever (lock-operation lever) 40, a lock spring 50, and a biasing spring (biaser) 70 that are installed in the associated upper rail 30.

Figure 11:
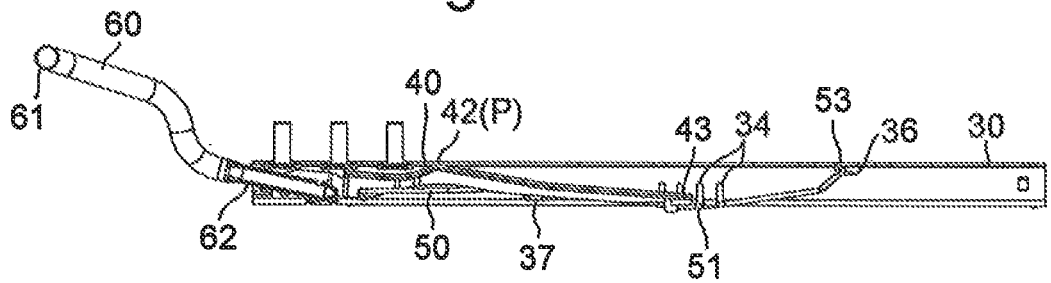
FIG. 11 is a side elevational view similar to that of FIG. 10 in an unlocked state with the biasing spring omitted.
Figure 12:
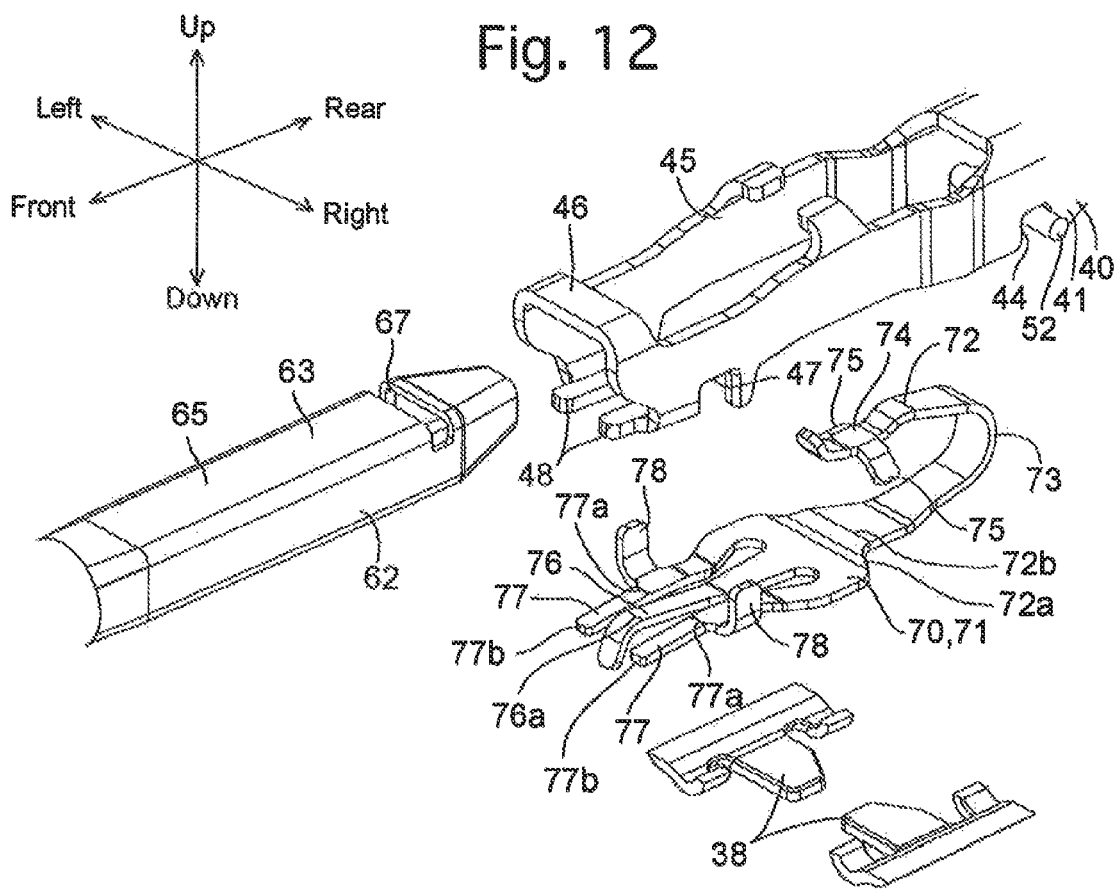
FIG. 12 is an enlarged exploded perspective view of the front end of the lock-release lever, the biasing spring, the lower support portion and a rear end of the loop handle.
Figure 13:
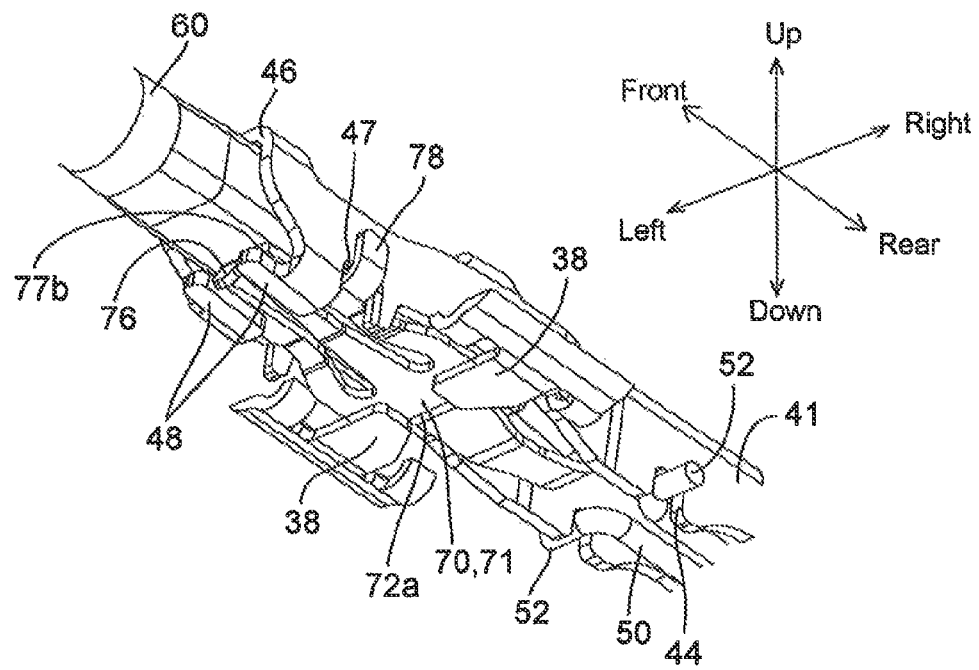
FIG. 13 is an enlarged perspective view of the front end of the lock-release lever, the biasing spring and the rear end of the loop handle in a mutually assembled state, viewed obliquely from below.
Figure 14:
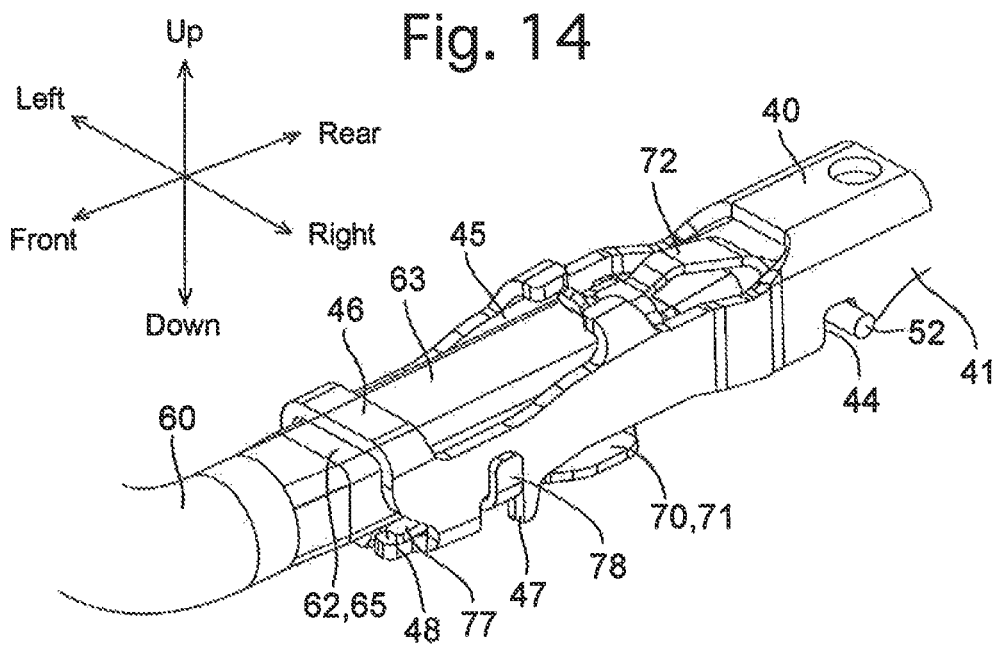
FIG. 14 is an enlarged perspective view of the front end of the lock-release lever, the biasing spring and the rear end of the loop handle in a mutually assembled state, viewed obliquely from above.

The lock-release lever 40 is a metal channel member which is press-molded from a metal plate, extends in the forward/rearward direction, and the bottom thereof is open, is provided with a pair of left and right side walls 41. As shown in FIGS. 2, 5, 10 and 11, etc., a rotational contact protrusion (rotational supporter) 42 which extends in the leftward/rightward direction is provided on an upper surface of the lock-release lever 40 to protrude therefrom. In addition, a pair of left and right spring-pressing lugs 43 are provided on the rear end of the lock-release lever 40 so as to protrude therefrom in substantially horizontal (and opposite) directions, and upward-extending spring-hook grooves 44 are formed in the lower ends in the vicinity of the front ends (portions at a position further forward from the rotational contact protrusion 42) of the left and right side walls 41. As shown in FIG. 12, etc., a roof hole 45 is formed in the upper surface of the lock-release lever 40 in the vicinity of the front end thereof, and an upper support member 46 which connects each front end of the left and right side walls 41 is formed on the front portion of the lock-release lever 40. Furthermore, a spring-hook groove (lock-engaging portion) 47 in formed in the lower edge of each left and right side wall 41 in the vicinity of the front end thereof, and inwardly-protruding lower support portions (front spring support portions) 48 are formed at the front ends of the left and right side walls 41 and extend in a substantially horizontal direction.

The biasing spring 70 is a bilaterally-symmetrical leaf spring that is press-molded out of metal plate. The biasing spring 70 is provided with a flat-plate shaped base-surface support portion 71, an upper-surface pressing portion 72 which extends rearwardly from the rear end of the base-surface support portion 71 and thereafter extends forwardly in an upward oblique direction and further extends forwardly in a downward oblique direction, a base-surface pressing portion 76 which extends forwardly in an upward oblique direction from the front end of the base-surface support portion 71 and is bent downwardly in a forward oblique direction at the front end thereof, and a pair of left and right side arms 77 that forwardly extend from the front edge of the base-surface support portion 71. An insertion end portion 73 having a U-shaped side elevation (when viewed in the left/right direction) is formed at a rear end portion of the upper-surface pressing portion 72, and a handle pressing portion 74 is formed on the front end of the upper-surface pressing portion 72. The handle pressing portion 74 is provided with a pair of left and right downward-extending lock-engaging lugs 75. Furthermore, the portion of the upper-surface pressing portion 72 that is positioned immediately behind a linear base end portion (a portion that connects with the base-surface support portion 71 spring-support contact portion) 72a that extends in the left/right direction forms a bent stepped portion (handle contacting portion) 72b that is positioned a step upward from the base end portion 72a and extends in the left/right direction so as to have a substantially arcuate sectional shape. Furthermore, upward-extending lock-engaging lugs (engaging portion) 78 are respectively provided on the left and right side arms 77, so as to protrude upwardly therefrom. Furthermore, an intermediate bent portion 77a, having a substantially arcuate sectional shape, is formed on each of the left and right side arms 77 at an intermediate position with respect to the longitudinal direction thereof. The portions of the left and right side arms 77 that are positioned forward from the intermediate bent portions 77a are inclined slightly downward with respect to (a straight line extending forward from) portions positioned behind the intermediate bent portions 77a.

The biasing spring 70 is inserted into the internal space of the front end of the lock-release lever 40 (the space located immediately below the roof hole 45) from the front end opening of the lock-release lever 40 (between the upper support member 46 and the lower support portions 48). When the biasing spring 70 is inserted, since the upward-extending lock-engaging lugs 78 engage from below with the left and right spring-hook grooves 47 of the lock-release lever 40, the biasing spring 70 becomes integral with the lock-release lever 40 so as to be restricted from forward/rearward movement.

The lock spring (rotational supporter) 50 is a substantially bilaterally-symmetrical member formed by bending a metal wire rod. A pair of front and rear lock portions (lock mechanism) 51 which extend substantially horizontally outwards are formed on left and right sides of the lock spring 50 at positions slightly behind central portions thereof, with respect to the longitudinal direction. A portion of the lock spring 50 which is positioned behind the lock portions 51 (except the rear end portion) extends substantially horizontally (in the frontward/rearward direction) when in a free state, and a portion of the lock spring 50 which is positioned in front of the lock portions 51 (except the front end portion) extends substantially horizontally (in the frontward/rearward direction) when in a free state. The lock spring 50 is provided at the front end thereof with a pair of left and right front-end lock-engaging lugs 52 which project mutually outward and substantially horizontally. The rear end of the lock spring 50 is provided with a rear-end lock-engaging portion 53 which inclines upward in a side view.

Figure 15:
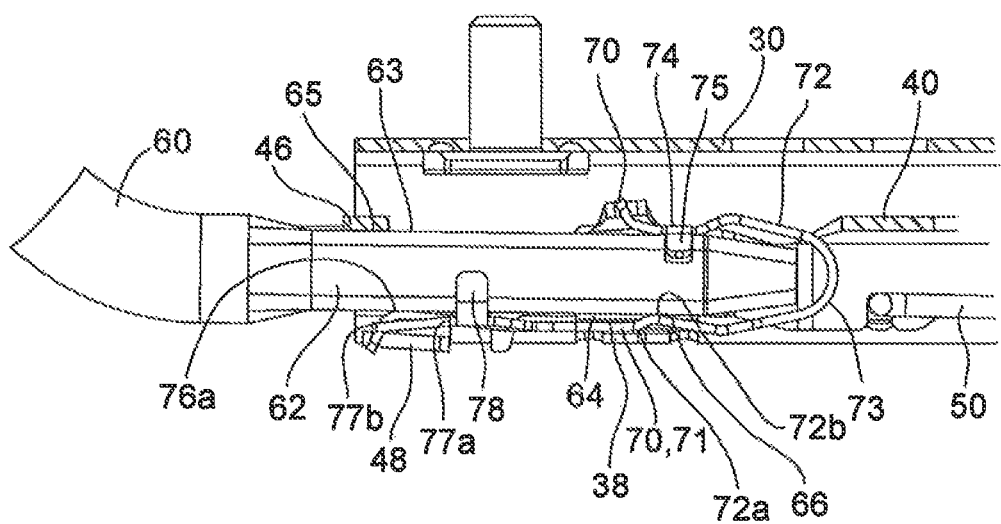
FIG. 15 is an enlarged longitudinal sectional side view showing the front end of the upper rail and the lock-release lever, the biasing spring, and the rear end of the loop handle, in a locked state.
Figure 16:
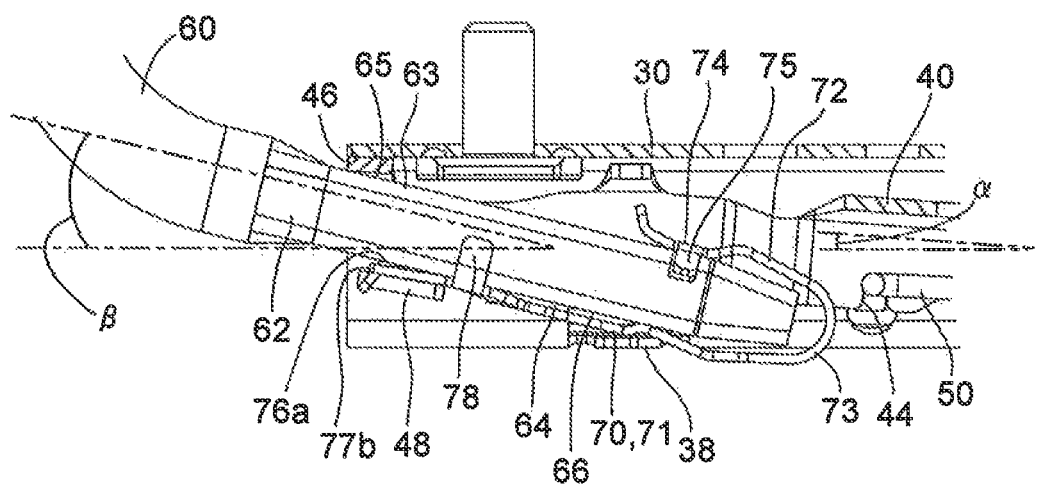
FIG. 16 is an enlarged longitudinal sectional side view similar to that of FIG. 15, showing an unlocked state thereof.

The rear end of the lock-release lever 40 (and biasing spring 70) is inserted into the front end of the internal space of the upper rail 30 from the front opening of the upper rail 30 (between the front end portion of the base 31 and the lower support members 38), and thereafter, by sliding the entire lock-release lever 40 rearwardly relative to the upper rail 30, substantially the entire lock-release lever 40 is accommodated inside the upper rail 30 (as shown in FIGS. 15 and 16, with only the front end of the upper support member 46 protruding from the front of the upper rail 30). Hence, upon substantially the entire lock-release lever 40 being accommodated in the upper rail 30, the rotational contact protrusion 42 comes in contact with the inner roof surface of the base 31 (see contact point 'P' in FIGS. 10 and 11; and spaces are defined between the inner roof surface of the base 31 and portions of the upper surface of the lock-release lever 40 other than the rotational contact protrusion 42), and since the left and right lower support members 38 are positioned immediately below the base-surface support portion 71 of the biasing spring 70, the upward-extending lock-engaging lugs 78 are prevented from falling down from the spring-hook grooves 47 (the biasing spring 70 is prevented from falling down from the lock-release lever 40). As shown in FIGS. 6 through 8, 10 and 11, the rear-end lock-engaging portion 53 of the lock spring 50 is lock-engaged with the locking lug 36 (see the triangle in FIG. 10), the portions of the lock spring 50 which are positioned slightly forward from the left and right lock portions 51 are respectively lock-engaged with the left and right locking lugs 37 (see the triangle in FIG. 10), each of the lock portions 51 is engaged from below the forward/rearward-movement restricting grooves 34, respectively, and the left and right front-end lock-engaging lugs 52 are lock-engaged with the spring-hook grooves 44 from below. Hence, the locking lugs 43 come in contact with the upper surface of the portions positioned between the pair of lock portions 51 of the lock spring 50 from above. Hence, upon the lock spring 50 being assembled into the upper rail 30 and the lock-release lever 40, the lock spring 50 becomes movable with respect to the upper rail 30 within a minute range in the forward/rearward direction in which the lock-engagement of the rear-end lock-engaging portion 53 of the lock spring 50 with the locking lug 36 of the upper rail 30 is not released, and the front-end lock-engaging lugs 52 maintain the lock-engagement thereof with the spring-hook grooves 44. Furthermore, since the lock spring 50 generates an upward biasing force (elastic force) by the elastic deformation thereof (see vertical arrow in FIG. 10), the rotational contact protrusion 42 of the lock-release lever 40 is pressed against the inner roof portion of the base 31 by this upward biasing force, the lock-release lever 40 is rotatable about the contact point P between the roof portion of the base 31 and the rotational contact protrusion 42 (about an imaginary rotational axis extending in the left/right direction), and the lock-release lever 40 is maintained at the locked position shown in FIGS. 10 and 15 when an upward external force is not applied to the front end portion of the lock-release lever 40. Whereas, upon applying an upward external force on the front end of the lock-release lever 40 against the biasing force of the lock spring 50, the lock-release lever 40 is rotated to the unlocked position shown in FIGS. 11 and 16. Accordingly, as shown in FIG. 11, since the locking lugs 43 of the lock-release lever 40 push down the portions of the lock spring 50 positioned between the pair of lock portions 51, each lock portion 51 disengages (escapes) downward from the corresponding lock groove 28 (see the lock portions 51 indicated by phantom lines in FIG. 9).

Figure 4:
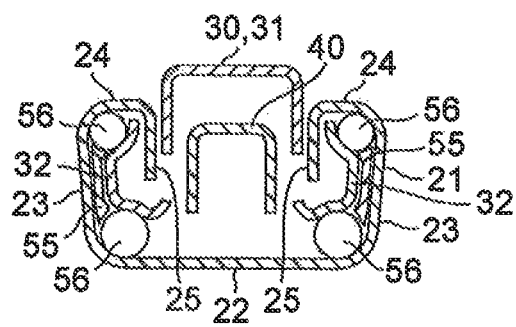
FIG. 4 is a sectional view taken along the line IV-IV shown in FIG. 1.

An assembly made by inserting a combination of one upper rail 30, one lock release lever 40, one lock spring 50 and one biasing spring 70, which are assembled together in the above described manner, into one lower rail 21 from the front or rear end opening of the lower rail 21 constitutes one rail unit 20. When one rail unit 20 is assembled, the upright walls 32 and the locking walls 33 of the upper rail 30 enter the spaces formed between the outer wall portions 23 and the inner wall portions 25 as shown in FIG. 4 (the locking walls 33 are omitted in FIG. 4), and a plurality of bearing balls 56, which are rotatably supported by retainers 55 installed in the aforementioned spaces, are in rotatable contact with both outer surfaces of the upright walls 32 and inner surfaces of the outer wall portions 23, which allows the upper rail 30 (and the lock release lever 40 and the lock spring 50) to slide in the forward/rearward direction with respect to the lower rail 21. Furthermore, since a front stopper device and a rear stopper device (which are not shown in the drawings) are provided between the upper rail 30 and the lower rail 21, the upper rail 30 is slidable on the lower rail 21 between a front end position (not shown) and a rear end position (shown in FIG. 1).

Figure 8:
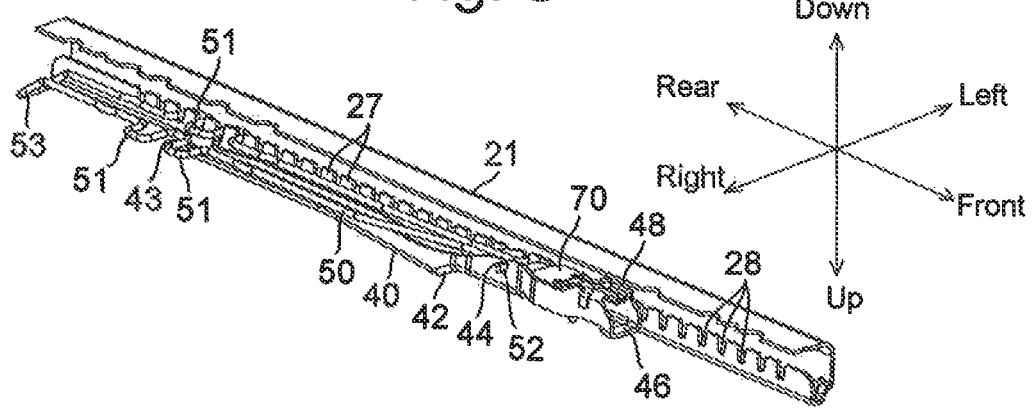
FIG. 8 is a front perspective view of a lower rail shown in a longitudinal sectional view, a lock-release lever, and a lock spring, viewed obliquely from below.
Figure 9:
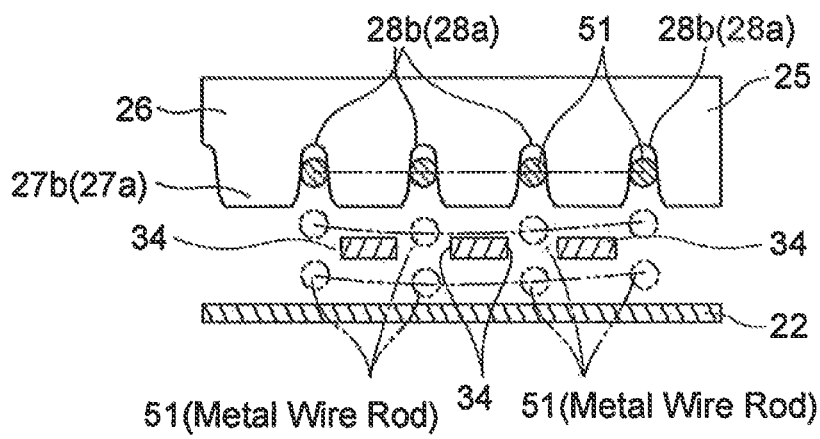
FIG. 9 is a schematic side view showing a state where a lock spring is in a locked position and a state where the lock spring is in an unlocked position.

In addition, when the lock release lever 40 is in the locked position, the upper rail 30 is prevented from sliding with respect to the lower rail 21 because each lock portion 51 is engaged with the associated forward/rearward-movement restricting grooves 34 and the lock grooves 28 from below as shown in FIG. 8 and by the solid lines in FIG. 9. On the other hand, rotating the lock release lever 40 down to the unlocked position causes each lock portion 51 that was engaged with the lock grooves 28 to be disengaged downward therefrom, as shown by the phantom lines of FIG. 9, which allows the upper rails 30 to slide with respect to the lower rails 21.

The pair of left and right rail units 20 thus assembled are made to be parallel to each other and the positions thereof in the forward/rearward direction are made to coincide with each other (the sliding positions of the upper rails 30 with respect to the lower rails 21 are also made to coincide with each other); thereafter, a seating portion of a seat (not shown) is mounted onto the top surfaces of the upper rails 30.

After the left and right rail units 20 and the seat are integrated in this manner, a loop handle 60 is connected to the left and right lock release levers 40 using the biasing springs 70.

The loop handle 60 is a member made by bending a metal pipe and is provided with a grip portion 61 and a pair of rear-end connecting portions 62, wherein the grip portion 61 includes a linear portion extending in the leftward/rightward direction and a pair of oblique portions extending obliquely rearwardly downward from both left and right ends of the linear portion while the pair of rear-end connecting portions 62 extend rearward from both left and right ends of the grip portion 61. An upper contacting surface 63 and a lower contacting surface 64 of each rear-end connecting portion 62 are mutually parallel (horizontal) flat surfaces. A front portion of the upper contacting surface 63 serves as an upper supported surface 65, and a rear portion of the lower contacting surface 64 serves as a lower supported surface 66. Furthermore, a lock-engaging groove 67 which extends in the leftward/rightward direction is formed in the upper contacting surface 63 in the vicinity of the rear end thereof.

The loop handle 60 is connected to the lock-release lever 40 by inserting the left and right rear-end connecting portions 62 into the internal space of the front end of each lock-release lever 40. When the rear-end connecting portion 62 is inserted into the lock-release lever 40, the rear-end connecting portion 62 enters into the space between the base-surface support portion 71 and the upper-surface pressing portion 72 (handle pressing portion 74) of the biasing spring 70, the base-surface support portion 71 contacts the lower contacting surface 64, the left and right downward-extending lock-engaging lugs 75 fit into the lock-engaging groove 67, and the handle pressing portion 74 contacts a portion near the rear end of the upper contacting surface 63 (a portion surrounding the lock-engaging groove 67). The biasing spring 70 is in a free state before the insertion of the rear-end connecting portion 62 into the internal space of the front end of the lock-release lever 40, and in this state, since the vertical space (in the upward/downward direction) between the base-surface support portion 71 and the handle pressing portion 74 is smaller than the vertical dimensions of the rear-end connecting portion 62, when the rear-end connecting portion 62 is inserted into the space between the base-surface support portion 71 and the upper-surface pressing portion 72 (handle pressing portion 74), the upper-surface pressing portion 72 elastically deforms upward, so that the base-surface support portion 71 and the handle pressing portion 74 apply a pressing force on the lower contacting surface 64 and the upper contacting surface 63, respectively, of the rear-end connecting portion 62. Furthermore, as shown in FIG. 15, the lower edges of end portions (lower support portion) 77b of the left and right side arms 77 contact the upper surfaces of the lower support portions 48 at forward positions from the rear edges of the lower support portions 48, and the intermediate bent portions 77a are positioned upward away from the lower support portions 48, respectively. Furthermore, a bent portion (upward-pressing portion) 76a formed in the vicinity of the front end of the base-surface pressing portion 76, which is elastically deformed downwardly, contacts the front portion of the lower contacting surface 64. Accordingly, the left and right rear-end connecting portions 62 and the front end of each lock-release lever 40 become integrated with each other via each biasing spring 70, and the rear-end connecting portions are substantially restricted from moving in the forward/rearward direction relative to the lock-release levers 40, respectively.

Upon the slide seat device 10 being assembled by integrally combining the loop handle 60 with the left and right rail units 20, since each rear-end connecting portion 62 constantly receives the upward biasing force from the base-surface pressing portion 76 (bent portion 76a) and also constantly receives the downward biasing force from the upper-surface pressing portion 72 (handle pressing portion 74), the upper supported surface 65 is constantly in contact with the upper support member 46 (to be rotatable about a rotational axis extending in the leftward/rightward direction), the lower supported surface 66 is always in contact with the bent stepped portion 72b, and the base end portion 72a is always in contact with the lower support members 38 (to be rotatable about a contacting position extending in the leftward/rightward direction on the base end portion 72a and the upper surface of the lower support members 38).

As described above, in the slide rail device 10, the biasing spring 70 can be easily assembled into the internal space of the lock-release lever 40, so that relative movement thereof in the forward/rearward direction is restricted, simply by engaging the upward-extending lock-engaging lugs 78 into the spring-hook recess 47 of the lock-release lever 40, and by inserting the rear end portions of the loop handle 60 into the internal space of each lock-release lever 40, the rear end portions of the loop handle 60 can be supported by the biasing spring 70, respectively. Accordingly, it is possible to rapidly carry out the assembly process of the slide rail device 10.

Moreover, after the integrated component configured of the lock-release lever 40 and the biasing spring 70 is inserted into the internal space within the upper rail 30, and upon the lock spring 50 being utilized to integrate the upper rail 30 with the lock-release lever 40, the biasing spring 70 can be prevented by the lower support members 38 from falling down from the undersurface opening of the lock-release lever 40 since the lower support members 38 are positioned immediately below the base-surface support portion 71.

The assembled slide rail device 10 is mounted to the interior vehicle floor by mounting mounting-brackets 15 that are attached to the lower rail 21 to the interior vehicle floor.

Hereinafter, the operation of the slide rail device 10 will be described.

When an occupant manually grasps the grip portion 61 and rotates the entire loop handle 60 upward, this rotational force is transferred from the rear-end connecting portions 62 to the front end portions of each lock-release lever 40 so that each lock-release lever 40 moves upward together with the rear-end connecting portions 62. Subsequently, since each lock-release lever 40 which was positioned at the locked position is rotated to the unlocked position, the upper rail 30 which was restricted from sliding with respect to the lower rail 21 becomes slidable (movable) relative to the lower rail 21.

Details of the operations of the rear-end connecting portions 62 (loop handle 60), the lock-release lever 40, and the biasing spring 70 during the lifting operation of the loop handle 60 are described hereinbelow.

Figure 10:
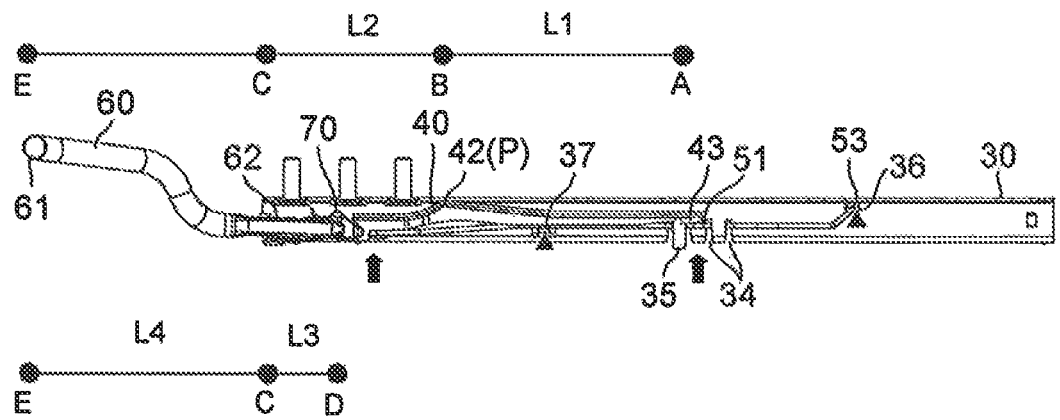
FIG. 10 is a side elevational view of the upper rail, the lock-release lever, the biasing spring, and a loop handle in a locked state, wherein only the upper rail is shown in a longitudinal sectional view.

As shown in FIGS. 10 and 15, when the occupant does not apply force on the loop handle 60 (when the lock-release lever 40 is positioned in the locked position), since the upper supported surface 65 is in surface contact with the upper support member 46, and the base-surface support portion 71 of the biasing spring 70, the bent stepped portion 72b thereof being in contact with the lower supported surface 66, is in surface contact with each of the lower support members 38, the rear-end connecting portion 62 is held at a position such that the longitudinal axis thereof is aligned with the longitudinal axis of the front end portion of the lock-release lever 40. Upon the loop handle 60 being rotated upward from this state, the left and right rear-end connecting portions 62 rotate relative to the respective left and right upper rails 30 about the contacting position between the upper supported surface 65 and the upper support member 46, and about the contacting position between the base end portion 72a and the lower support members 38, and furthermore, the rear end portion of the lock-release lever 40, the upper support member 46 of which is pushed upwards by the upper supported surface 65, is rotated downward about the rotational contact protrusion 42 (P) (see FIGS. 11 and 16). In this arrangement, a lifting force F1 of the grip portion 61 applied by the occupant in the upward direction is: $F1=F\times L1/L2\times L3/L4$, wherein L1 designates the distance in the forward/rearward direction from point A (the position of action on the locking lugs 43 against the lock portions 51), to point B (the position of the rotational contact protrusion 42, i.e., the position of the center of rotation of the lock-release lever 40), when the occupant does not apply a force on the loop handle 60; L2 designates the distance in the forward/rearward direction from point B to point C (the upper support member 46); L3 designates the distance in the forward/rearward direction from point C to point D (the lower support members 38); L4 designates the distance in the forward/rearward direction from point C to point E (the grip portion 61); and F designates the downward moving force applied by the locking lugs 43 to the lock spring 50 when the lock-release lever 40 is moved to the unlocked position (the lock portions 51 have moved downwardly and out of the lock grooves 28).

Figure 17:
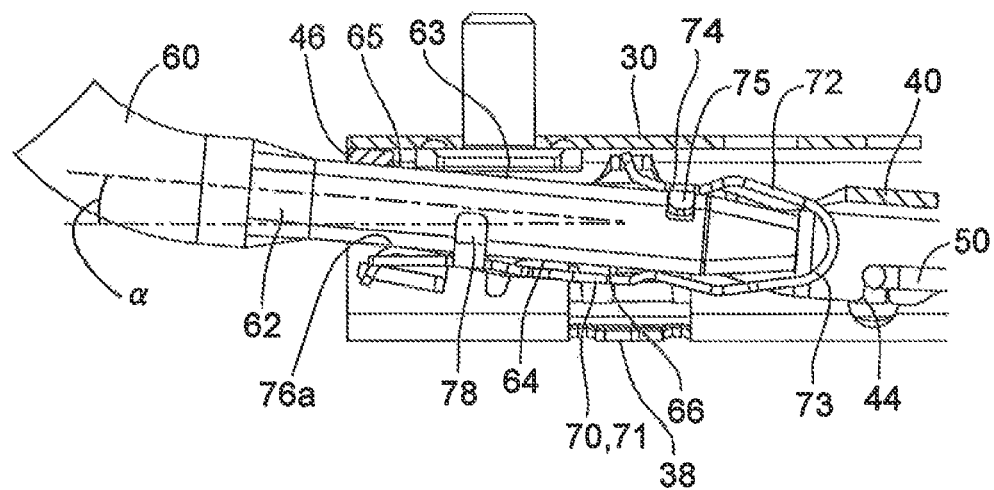
FIG. 17 is an enlarged longitudinal sectional side view similar to that of FIG. 15, showing an unlocked state of a comparative example in which a loop handle does not contact a lower support portion.

Whereas, as shown in a comparative example of FIG. 17, in the case of a structure in which the rear-end connecting portion 62 is rotated while the longitudinal axes of the rear-end connecting portion 62 and the lock-release lever 40 are aligned (a structure in which the rear-end connecting portion 62 is fixed to the lock-release lever 40 so as not to move relative thereto), the upward lifting force F2 of the grip portion 61 carried out by the occupant is: $F2=F\times L1/(L2+L4)$.

In the illustrated embodiment, L1=125.7 mm, L2=96.0 mm, L3=36.5 mm and L4=115.1 mm, and therefor, F1=0.42 F and F2=0.60 F; accordingly, the occupant can carry out a lock-release operation with less force compared to the case of the comparative embodiment of FIG. 17.

Furthermore, if point D is positioned further forward than point B, even in the case of the dimensions of L1 through L4, the rotational angle β in the upward direction of the loop handle 60 (grip portion 61) with respect to the upper rail 30 becomes greater than the rotational angle α of the lock-release lever 40 with respect to the upper rail 30 (the rotational angle of the loop handle 60 in the case of the comparative example in FIG. 17 is also α). Accordingly, since a lock-release operation is not performed unless the occupant rotates the grip portion 61 upward by a relatively large rotational angle, it is possible to provide the occupant with a comfortable operational feel.

Furthermore, as shown in the drawings, since the lock-release lever 40 is provided in the internal space of the upper rail 30, the upward/downward rotatable range of the lock-release lever 40 is restricted to a narrow range. However, since the upward rotational angle (α) of the lock-release lever 40 upon performing a lock-release operation is smaller than the upward rotational angle (β) of the loop handle 60, the lock-release lever 40 can reliably carry out a lock-release operation without the lock-release lever 40 contacting the inner surface of the upper rail 30.

Furthermore, when the loop handle 60 is rotated upward/downward (when the lock-release lever 40 is rotated between the locked position and the unlocked position), since the base end portion 72a of the biasing spring 70 is always in contact with the lower support members 38 (to be rotatable about a contacting portion that extends in the leftward/rightward direction between the base end portion 72a and the lower support members 38), and the bent stepped portion 72b is always in contact with the lower supported surface 66 (to be rotatable about a contacting portion that extends in the leftward/rightward direction between the bent stepped portion 72b and the lower supported surface 66), the contact position between the lower support members 38 and the biasing spring 70 and the contact position between the biasing spring 70 and the loop handle 60 do not change. Therefore, variations in the operational force upon the loop handle 60 being rotated by the occupant do not easily occur, so that the occupant can rotatably operate the loop handle 60 with the same amount of forces each time.

Furthermore, when the loop handle 60 is rotated from the position shown in FIG. 15 to the position shown in FIG. 16, the occupant can rotatably operate the loop handle 60 with a small amount of force.

Figure 18A:
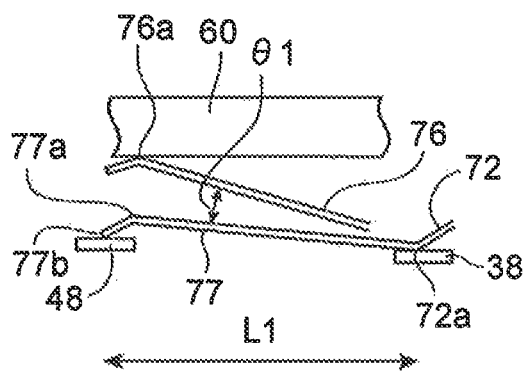
FIG. 18A shows a schematic diagram of the loop handle, the biasing spring, the lower support members, and the lower support portions in a locked state, according to the illustrated embodiment.
Figure 18B:
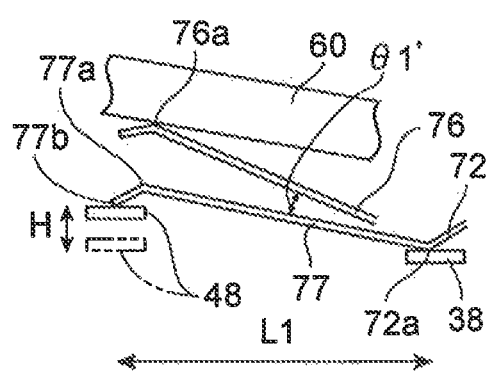
FIG. 18B shows a schematic diagram of the loop handle, the biasing spring, the lower support members, and the lower support portions in an unlocked state, according to the illustrated embodiment.

In other words, as shown in FIG. 18A, when the loop handle 60 is at the position shown in FIG. 15 (when in a locked position), the distance in the forward/rearward direction between the base end portion 72a and the end portions 77b of the slide rail device 10 of the illustrated embodiment is L1, and the angle between the base-surface pressing portion 76 and the side arms 77 is θ1. Furthermore, as shown in FIG. 18B, when the loop handle 60 is moved upward to the position shown in FIG. 16 (when entering an unlocked position), the lower support portions 48 move upward from the position shown in FIG. 15 by a distance H, and the angle between the base-surface pressing portion 76 and the side arms 77 becomes θ1' (the distance in the forward/rearward direction between the base end portion 72a and the end portions 77b is slightly shorter than L1, however, since there is only a negligible difference in distance, this distance is designated as L1 for convenience). Since intermediate bent portions 77a are formed in the side arms 77 of the illustrated embodiment, when the loop handle 60 is rotated from the position shown in FIG. 15 to the position shown in FIG. 16, the portions of the side arms 77 that are positioned behind the end portions 77b do not contact the lower support portions 48, so that the difference between θ1 and θ1' is extremely small.

Figure 18C:
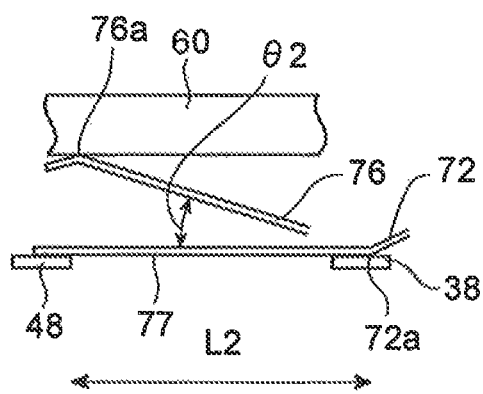
FIG. 18C shows a schematic diagram of a loop handle, a biasing spring, a lower support portion, and the lower support portions in a locked state, of a comparative example.
Figure 18D:
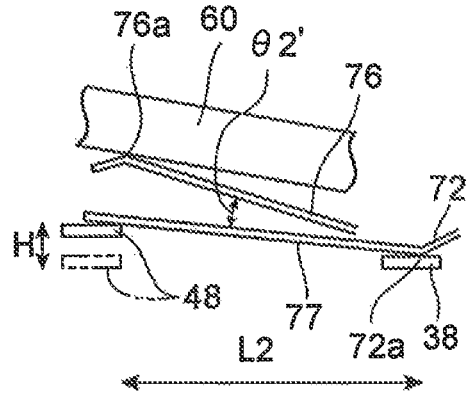
FIG. 18D shows a schematic diagram of a loop handle, a biasing spring, a lower support portion, and the lower support portions in an unlocked state, of a comparative example.
Figure 19:
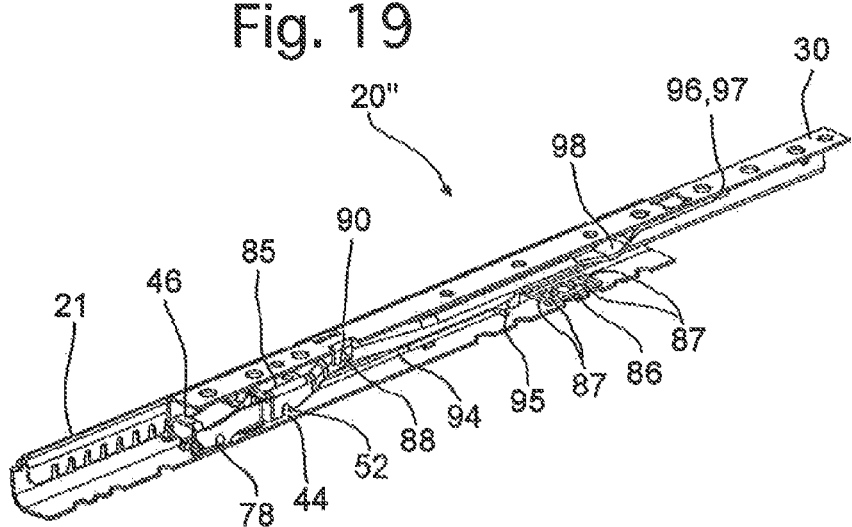
FIG. 19 is a perspective view similar to that of FIG. 6 showing a second embodiment according to the present invention.

Whereas, as shown in FIG. 18C, in the comparative example in which the intermediate bent portions 77a are not formed in the side arms 77, when the loop handle 60 is at the position shown in FIG. 15 (when in a locked position), the distance in the forward/rearward direction between the rear end of the lower support portions 48 (and the contact points of the left and right side arms 77) and the base end portion 72a is L2, and the angle between the base-surface pressing portion 76 and the side arms 77 is θ2. Furthermore, as shown in FIG. 18D, when the loop handle 60 is moved upward to the position shown in FIG. 16 (when entering an unlocked position), the lower support portions 48 move upward from the position shown in FIG. 15 by a distance H, the rear end portions of the lower support portions 48 come in contact with the undersurfaces of the side arms 77, and the portions of the left and right side arms 77 which are positioned in front of the rear ends of the lower support portions 48 are moved upward away from the lower support portions 48. Furthermore, the angle between the base-surface pressing portion 76 and the side arms 77 becomes θ2' (the distance in the forward/rearward direction between the rear end of the lower support portions 48 (and the contact points of the left and right side arms 77) and the base end portion 72a is slightly shorter than L2, however, since there is only a negligible difference in distance, this distance is designated as L2 for convenience). However, the difference between θ2 and θ' is larger than the above-described difference between θ1' and θ1'.

In other words, in order to rotate the loop handle 60 from the position shown in FIG. 15 to the position shown in FIG. 16, it is necessary for the side arms 77 to elastically deform from the state shown in FIGS. 18A and 18B to the state shown in FIGS. 18B and 18D, however, since the distance L1 is longer than the distance L2 (since the difference between θ2 and θ2' is larger than the difference between θ1' and θ1'), the side arms 77 of the slide rail device 10 in the illustrated embodiment elastically deform by the distance H via a smaller force than that of the side arms 77 in the comparative example. Accordingly, it is possible for the occupant to rotatably operate the loop handle 60 of the slide rail device 10 from the position shown in FIG. 15 to the position shown in FIG. 16 by a small amount of manual force.

A second embodiment according to the present invention will be hereinafter discussed with reference to FIGS. 19 through 23. Note that members that are the same as those of the first embodiment are designated with the same numerals, and detailed explanations thereof have been omitted.

In a slide rail device 20" of the second embodiment, a lock lever (lock-operation lever) 85 is provided instead of the lock-release lever 40 of the first embodiment. The fundamental structure of the lock lever 85 is that same as that of the lock-release lever 40, and is likewise provided with left and right side walls 41, spring-hook grooves 44, a roof hole 45, an upper support member 46, spring-hook recesses 47, and lower support portions 48. The loop handle 60 is connected to the front end portion of the lock lever 85. Whereas, the rear end portion of the lock lever 85 is provided with a left and right pair of horizontal lock-plates 86. As shown in the drawings, each of the horizontal lock-plates 86 is provided with three rectangular through-holes formed therethrough, and the three rectangular through-holes define a total of four locking portions (lock mechanism) 87 which are arranged at equal intervals in the forward/rearward direction on either side of the three rectangular holes, respectively. Furthermore, a pair of left and right cylindrical supporting portions (rotational supporter) 88 which extend in the leftward/rightward direction are provided at the front portion of the lock lever 85.

Figure 20:
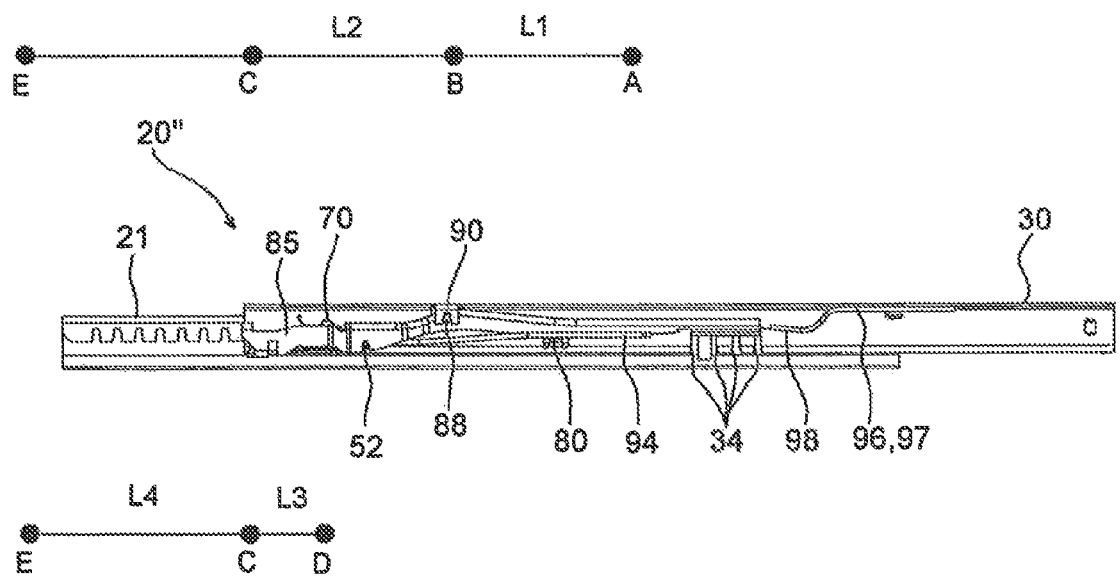
FIG. 20 is a longitudinal sectional side view of the rail unit shown in FIG. 19.
Figure 21:
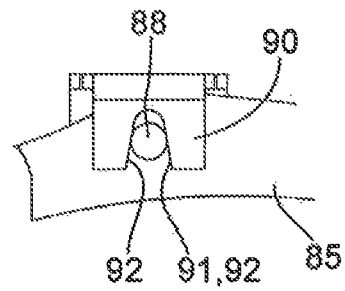
FIG. 21 is an enlarged plan view of a rotational support part and a supported portion of the rail unit shown in FIG. 19.
Figure 22:
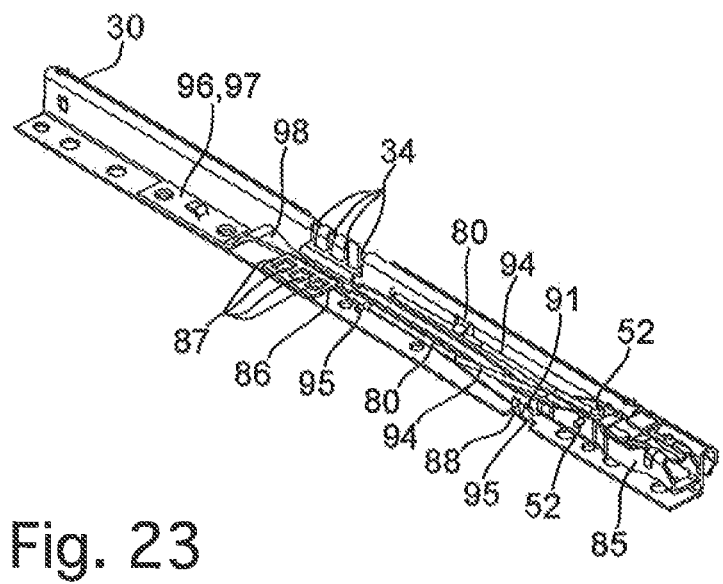
FIG. 22 shows a perspective view similar to that shown in FIG. 7.
Figure 23:
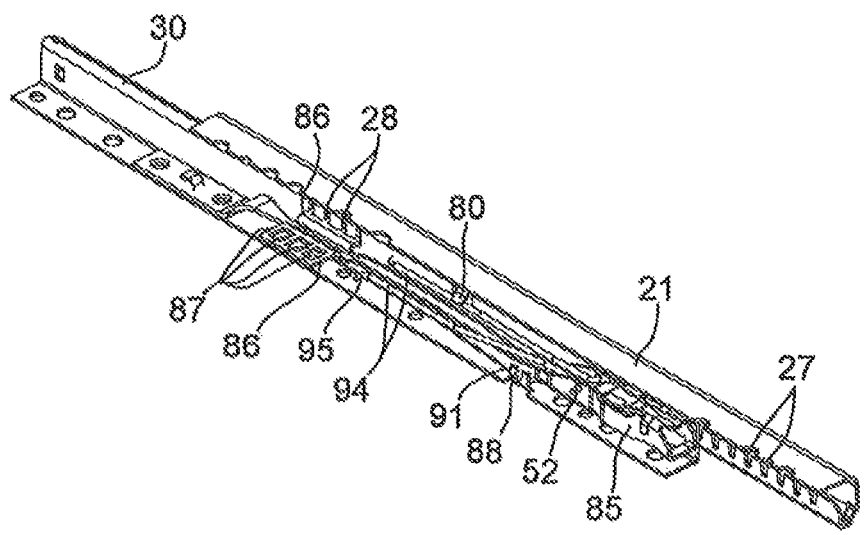
FIG. 23 shows a perspective view, similar to that shown in FIG. 8, of the rail unit shown in FIG. 19.

A pair of left and right rotational support members 90 are formed on the roof portion of the base 31 of the upper rail 30 by being cut and raised downwards. As shown in FIGS. 20 and 21, a V-shaped groove (rotational supporter) 91 which extends upward is formed in the lower edge of each of the left and right rotational support members 90. As shown in FIG. 21, a pair of support surfaces 92 which define a front surface and a rear surface of each V-shaped groove 91 are bisymmetrical in the forward/rearward direction and the mutual distance therebetween in the forward/rearward direction increasingly narrows with respect to the upward direction. The left and right cylindrical supporting portions 88 of the lock lever 85 engage with the V-shaped grooves 91 of the left and right rotational support members 90, respectively, from below. Furthermore, the locking portions 87 of the left and right the horizontal lock-plates 86 are engaged with the left and right forward/rearward-movement restricting grooves 34 from below. Although not shown in the drawings, the locking portions 87 of the horizontal lock-plates 86 are disengageably-engaged with the lock grooves 28 of the lower rail 21 from below.

Furthermore, instead of the lock spring 50, the slide rail device 20" is provided with a pair of left and right front biasing springs (lock biaser) 94 formed by a metal wire rod. The left and right front biasing springs 94 are mutually bilaterally symmetrical, are respectively provided with front-end lock-engaging lugs 52 at the front ends thereof which engage with the spring-hook grooves 44, respectively. The rear ends of the left and right front biasing springs 94 are provided with rear-end lock-engaging lugs 95, having the same shape of that of the front-end lock-engaging lugs 52, which respectively fit into support through-holes (not shown) respectively formed through the left and right side walls of the base 31 of the upper rail 30. Furthermore, since the intermediate portions of the left and right front biasing springs 94 are lock-engaged with intermediate lock-engaging members 80 of the upper rail 30 (and the side walls of the base 31) from above, an upward biasing force is applied from the left and right front-end lock-engaging lugs 52 to the lock lever 85 (spring-hook grooves 44). Accordingly, due to this upward biasing force (engagement-assisting biasing force), the left and right cylindrical supporting portions 88 move up into the V-shaped grooves 91, so that when the left and right cylindrical supporting portions 88 reach a predetermined vertical position (with respect to the upward/downward direction), each left and right cylindrical supporting portion 88 contacts the pair of front and rear support surfaces 92 at two points, and this contacting state is maintained by the above-mentioned upward biasing force. Accordingly, the lock lever 85 is rotatable about the cylindrical supporting portions 88 in a steady manner, without vibrating or rattling in the forward/rearward direction with respect to the upper rail 30.

Furthermore, a base part 97 which forms a rear portion of a metal rear biasing spring (lock biaser) 96 is fixed to a rear portion of the underside surface of the roof of the base 31 of the upper rail 30. A elastically-deformable portion 98 is provided on the base part 97 so as to extend therefrom in the forward direction, and since the upper surface of the elastically-deformable portion 98 is constantly biasing the rear end of the lock lever 85 upward, the engagement of the locking portions 87 of the horizontal lock-plates 86 with the forward/rearward-movement restricting grooves 34 is constantly maintained. Furthermore, since the engagement between the cylindrical supporting portions 88 of the lock lever 85 and the V-shaped grooves 91 is maintained due to the left and right front biasing springs 94 and the elastically-deformable portion 98 applying an upward biasing force on the lock lever 85, the lock lever 85 is rotatable about the cylindrical supporting portions 88 with respect to the upper rail 30. Furthermore, since the biasing force of the elastically-deformable portion 98 is larger than the biasing force of the front biasing springs 94, when an operational (manual) force is not applied to the loop handle 60, the lock lever 85 is positioned in a locked position (the position shown in FIG. 20) in which the locking portions 87 are engaged with the corresponding lock grooves 28. Whereas, if the occupant lifts the loop handle 60 upward against the biasing force of the elastically-deformable portion 98 (and the left and right front biasing springs 94), the lock lever 85 is rotated down to the unlocked position (not shown) at which the locking portions 87 disengage (escape) downwardly from the corresponding lock grooves 28.

In this case, as shown in FIG. 20, point A becomes the position of action of the lock lever 85 and the elastically-deformable portion 98, point B becomes the position of the left and right cylindrical supporting portions 88. Furthermore, in this case also, L1, L2, L3 and L4 are set so that F1 is less than F2.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A slide rail device for a vehicle comprising:
   a lower rail which extends in a forward and rearward direction, wherein the lower rail is immovable relative to a floor of said vehicle;
   an upper rail which supports a seat and is supported on said lower rail to be slidably movable in the forward and rearward direction relative to said lower rail;
   a lock mechanism provided between said upper rail and said lower rail, wherein said lock mechanism restricts and releases the restriction of a sliding movement of said upper rail;
   a lock-operation lever which is inserted into an internal space of said upper rail, wherein the front side and the underside of said lock-operation lever is open, and lower edge portions of said lock-operation lever is provided with a lock-engaging portion;
   a rotational supporter which supports the lock-operation lever, so that when said lock-operation lever is positioned at a predetermined position in said internal space, said lock-operation lever is upwardly and downwardly rotatable between a locked position and an unlocked position with respect to said upper rail, wherein said lock mechanism is allowed to restrict said sliding movement of said upper rail at said locked position, and wherein, at said unlocked position, a front portion of said lock-operation lever is moved upward from said locked position whereby said lock mechanism releases the restriction of said sliding movement of said upper rail;
   a handle, wherein a rear-end portion of said handle is inserted into said internal space of said lock-operation lever, and wherein a front end portion of said handle projects forward from a front opening of said lock-operation lever;
   a biasing spring which is provided with an engaging portion which engages with said lock-engaging portion from below so that said engaging portion is allowed to restrict a movement thereof relative to said lock-engaging portion in the forward and rearward direction, wherein said biasing spring supports said rear-end portion of said handle in said internal space of said lock-operation lever while restricting the movement of said handle relative to said lock-operation lever in the forward and rearward direction; and
   a spring support portion, provided on said upper rail, which is positioned immediately below said biasing spring and prevents said biasing spring from falling downward from an underside opening of said lock-operation lever when said rotational supporter supports said lock-operation lever.

2. The slide rail device according to claim 1, wherein said biasing spring comprises:
   a spring-support contact portion which is constantly in rotatable contact with said spring support portion;
   a handle contacting portion which is constantly in rotatable contact with an underside of said handle at a position that is away from said spring-support contact portion in an upward and forward or rearward direction.

3. The slide rail device according to claim 2, wherein said lock-operation lever comprises an upper support member; and
   a front spring support portion which is positioned further forward than said spring support portion and moves upward together with said lock-operation lever when said lock-operation lever is rotated from said locked position to said unlocked position,
   wherein an upper supported surface is formed on a portion of said handle that is positioned further forward from the rear end of said handle, wherein said upper supported surface is in rotatable contact in upward or rearward directions with said upper support member from below, and
   wherein said biasing spring comprises:
   an upward-pressing portion which is positioned further forward from said spring-support contact portion and which biases the underside of said handle in an upward direction; and
   a lower support portion which is constantly in contact with an upper surface of said front spring support portion at a position further forward than the rear end of said front spring support portion, wherein a portion of said biasing spring positioned between said lower support portion and said spring-support contact portion is constantly positioned away from said front spring support portion.

* * * * *